US012614949B2

(12) United States Patent
Ruppert et al.

(10) Patent No.: US 12,614,949 B2
(45) Date of Patent: Apr. 28, 2026

(54) HIGH-VOLTAGE TERMINAL

(71) Applicant: Schaeffler Technologies AG & Co. KG, Herzogenaurach (DE)

(72) Inventors: Andreas Ruppert, Bühlertal (DE); Robin Babian, Baden-Baden (DE); Dominik Knopp, Frankfurt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 287 days.

(21) Appl. No.: 18/273,065

(22) PCT Filed: Dec. 7, 2021

(86) PCT No.: PCT/DE2021/100979
§ 371 (c)(1),
(2) Date: Jul. 19, 2023

(87) PCT Pub. No.: WO2022/156842
PCT Pub. Date: Jul. 28, 2022

(65) Prior Publication Data
US 2024/0128825 A1     Apr. 18, 2024

(30) Foreign Application Priority Data

Jan. 20, 2021     (DE) .......................... 102021101149.3

(51) Int. Cl.
H02K 3/50          (2006.01)
H02K 5/22          (2006.01)

(52) U.S. Cl.
CPC ............... H02K 5/225 (2013.01); H02K 3/50 (2013.01); *H02K 2203/09* (2013.01)

(58) Field of Classification Search
CPC ........... H02K 5/225; H02K 3/50; H02K 3/52; H02K 3/38; H02K 11/33; H02K 11/30; H02K 2203/09

(Continued)

(56) References Cited

U.S. PATENT DOCUMENTS

| | | | |
|---|---|---|---|
| 2012/0169154 A1* | 7/2012 | Curodeau | B60L 50/20 |
| | | | 310/43 |
| 2015/0263580 A1 | 9/2015 | Houzumi et al. | |

(Continued)

FOREIGN PATENT DOCUMENTS

| | | |
|---|---|---|
| DE | 2758637 | 2/1979 |
| DE | 3445137 | 6/1986 |

(Continued)

OTHER PUBLICATIONS

Tesch et al, Electric Motor, Mar. 31, 2005, WO 2005029681 (English Machine Translation) (Year: 2005).*

*Primary Examiner* — Alexander A Singh
(74) *Attorney, Agent, or Firm* — Volpe Koenig

(57)          ABSTRACT

A high-voltage terminal for a stator, including at least three conductor phases for electrically connecting the high-voltage terminal to a power electronics unit and at least one star phase in the form of a rail, wherein each of the at least three conductor phases is formed of at least two parallel rail sections which are connected so as to be electrically isolated from one another and mutually radially spaced apart via at least one spacer element, preferably via at least two spacer elements, and wherein the at least three conductor phases and the at least one star phase are stacked one on top of the other within the high-voltage terminal to form a rail stack, and are inserted and/or embedded in a plastics element so as to be electrically isolated from one another via the spacer elements.

23 Claims, 12 Drawing Sheets

(58) Field of Classification Search
    USPC ............................................................ 310/71
    See application file for complete search history.

(56) References Cited

U.S. PATENT DOCUMENTS

| | | | |
|---|---|---|---|
| 2017/0093239 A1* | 3/2017 | Teranishi | H02K 3/28 |
| 2018/0097416 A1 | 4/2018 | Dang | |
| 2019/0006905 A1* | 1/2019 | Lindwurm | H02K 3/522 |
| 2019/0157934 A1 | 5/2019 | Kawaguchi et al. | |
| 2022/0320937 A1* | 10/2022 | Takada | H02K 3/50 |

FOREIGN PATENT DOCUMENTS

| | | |
|---|---|---|
| DE | 3534883 | 4/1987 |
| DE | 202007013483 | 3/2009 |
| DE | 102012214088 | 2/2013 |
| DE | 102016200115 | 7/2017 |
| DE | 102017103008 | 8/2017 |
| DE | 102018109407 | 10/2018 |
| DE | 102018214064 | 2/2019 |
| DE | 112017004261 | 5/2019 |
| DE | 102019100510 | 7/2019 |
| DE | 102019108073 | 10/2019 |
| DE | 102018208329 | 11/2019 |
| DE | 102018121358 | 3/2020 |
| DE | 102019111825 | 11/2020 |
| EP | 0029328 | 5/1981 |
| EP | 0484313 | 10/1991 |
| EP | 1783879 | 5/2007 |
| EP | 1350302 | 10/2014 |
| EP | 3490115 | 5/2019 |
| GB | 2544523 | 5/2017 |
| JP | 2019170013 | 10/2019 |
| KR | 1020130117207 | 10/2013 |
| WO | 2005029681 | 3/2005 |
| WO | WO-2005029681 A1 * | 3/2005 ............. H02K 5/225 |

* cited by examiner

1

22    23    25

HIGH-VOLTAGE TERMINAL

CROSS-REFERENCE TO RELATED APPLICATIONS

This application is the U.S. National Phase of PCT Appln. No. PCT/DE2021/100979, filed Dec. 7, 2021, which claims priority from German Patent Application No. 10 2021 101 149.3, filed Jan. 20, 2021, the entire disclosures of which are incorporated by reference herein.

TECHNICAL FIELD

The present disclosure relates to a high-voltage terminal for a stator of an electric machine.

BACKGROUND

Permanent magnet synchronous machines (PMSMs) are already being used in many industrial applications and, as part of the planned full electrification, are also increasingly being used in the automotive industry. Such a permanently excited synchronous machine generally has a stator to be energized and a permanently excited rotor. The stator comprises, among other things, a wire winding, a stator support, a connection ring and a terminal for the power electronics.

Electric machines with distributed windings or wave windings generally have a wiring region in which various conductors of the winding are connected to one another. This coupling is also known as a bridge, which is usually responsible for reversing the direction of the current flow. Furthermore, the interconnection can also contain a so-called star point. At this point, all conductors and currents of the different phases flow together according to a star connection. The electric machine has a high-voltage terminal as another component. This component is responsible for the power supply of the electric machine via the power electronics.

High-voltage terminals are meanwhile known from the prior art. For example, DE 10 2019 111 825 A1 discloses a stator for an electric machine having such a high-voltage terminal.

SUMMARY

Although such components are known from the prior art, there is still a desire to optimize them. Therefore, the object of the present disclosure is to provide a high-voltage terminal that is improved compared to the prior art, in particular to provide a high-voltage terminal that enables integration into a limited installation space of a stator winding in the most compact manner possible.

In a further aspect, the object of the present disclosure is to provide a high-voltage terminal that allows secure attachment to a component of a stator and at the same time minimizes the risk of the contact pins breaking with the conductors of a winding.

According to the disclosure, the object is achieved in a first aspect by a high-voltage terminal having one or more of the features disclosed herein and in a second aspect by a high-voltage terminal having one or more of the features disclosed herein.

The high-voltage terminal according to the disclosure for a stator comprises at least three conductor phases for the electrical connection of the high-voltage terminal to power electronics and at least one star phase designed as a rail, wherein each of the at least three conductor phases is formed from at least two parallel rail tracks, which are connected via at least one, preferably at least two spacer elements electrically isolated from one another and mutually radially spaced apart, and wherein the at least three conductor phases and the at least one star phase are stacked one on top of the other to form a rail stack within the high-voltage terminal and are inserted and/or embedded into a plastics element and are electrically isolated from one another via the spacer elements.

In terms of the solution according to the disclosure, the respective rail tracks of the same phase are connected to one another via at least one spacer element. In addition to the possibility of connection, the at least one spacer element also enables the maintaining of the necessary distance to maintain the air gaps and creepage distances within an interconnection ring. The air gaps and creepage distances can also be controlled via the geometric design of the spacer element.

Further advantageous embodiments are specified in the claims. The features listed individually in the dependent claims can be combined with one another in a technologically meaningful manner and can define further embodiments according to the disclosure. In addition, the features indicated in the claims are specified and explained in more detail in the description, wherein further preferred embodiments are shown.

In the context of the present disclosure, the term "plastics element" means a component which is made of a plastic and/or a material similar to a plastic. This can be formed, for example, from a plastic film, such as a polyimide film, or a casting composite based on epoxy resin and/or acrylate. Furthermore, the plastics element can also be formed from components that can be fitted together, which are formed from a plastic that is customary in electrical engineering, such as poly(phenylene sulfide) (PPS), polyphthalamide (PPA), polyetheretherketone (PEEK) and/or mixtures thereof, preferably consist of one of these.

The spacer elements can be formed from pre-molded parts, wherein two rail tracks, or more, can advantageously be pre-molded around them as an assembly. Alternatively and/or additionally, the at least two splint lines can be connected by means of a plastic inlay, preferably having a clip connection.

To be able to regulate and/or control the air gaps and creepage distances even better, it is advantageously provided that the spacer elements have axially extending spacer pins, the height of which then enables regulation or control. Depending on the position within the rail stack, the spacer elements can be arranged on one and/or both sides, wherein their respective heights can also be different.

The respective rails of the high-voltage terminal are advantageously designed in an arc shape and accordingly have an inner and an outer circumference. As a result, the high-voltage terminal can be designed to be arcuate as a whole component so that it can be implemented in a highly integrative manner on an annular configuration of a winding, in particular via the end winding between the connecting conductors of the inner and outer layers of the winding.

Advantageously, it is therefore provided that each of the rail tracks has a base body and a contact pin formed at both of its distal ends on the inner circumference and perpendicular to the base body and each extending in the same direction for contacting a winding of the stator of an electric machine.

In an advantageous embodiment variant, one of the two rail tracks of each conductor phase has a shorter extension in the circumferential direction than does the respective second rail track. The respective longer rail track then surrounds the shorter rail track in the radial direction in such a way that the contact pins of both rail tracks of the same phase are arranged on an imaginary inner circumferential line.

The star phase preferably has a base body, and two first contact pins formed perpendicular to the base body and extending parallel to one another on a first distal end on the outer circumference, two third contact pins formed perpendicular to the base body and extending parallel to one another on a second distal end of the base body on the outer circumference, and have two further second contact pins arranged on the outer circumference between the first and the third contact pins. In other words, all the contact pins of the star phase are thus arranged on an outer circumferential line spaced radially from the imaginary inner circumferential line. In this context, it is particularly preferably provided that the base body of the star phase has a longer extension in the circumferential direction compared to the conductor phases.

The contact pins of the respective rail tracks and the contact pins of the star phase advantageously extend in the same axial direction. In this case, these protrude from the plastics element and are usually connected to the conductors of the winding in a materially bonded manner via a welding process or soldering process. For technical reasons, some regions cannot be overmolded and must therefore be secured separately. To save this additional work step, a particularly advantageous variant provides that the contact pins of the respective rail tracks and the contact pins of the star phase have at least one embossing in the lower region, which can be overmolded with a plastic. This embossing creates a gap, which can then be overmolded with the respective plastic in the injection molding process to secure it, for example, against breaking out.

To facilitate the contacting of the individual conductors of the winding with the respective contact pins, it is advantageously provided that the plastics element of the high-voltage terminal comprises multiple openings, via which the individual conductors of the winding can be pre-fixed. In addition, it can advantageously be provided that each of the openings has an inlet bevel on the rear side, which particularly preferably extends at least over part of the circumference of the opening. The openings form a kind of catch mechanism and allow pre-centering of the individual conductors.

On its contact surface, optionally oriented towards the axial end face of a stator body, the plastics element can have a fixing element which extends out of the plane of the contact surface and via which the high-voltage terminal can be fixed to the stator body of the electric machine, preferably to the axial end face of the stator body. This fixing element gives the high-voltage terminal a clear position in the circumferential, tangential and axial direction. The fixing in the axial direction also compensates for the tolerances in the axial direction and allows the forces generated due to tolerance deviations to be balanced. The fixing element is advantageously designed in the form of a ring element which extends in the axial direction.

Furthermore, the plastics element can have an anti-rotation element on its contact surface oriented toward the axial end face of the stator body, via which the high-voltage terminal can be connected thereto in a torsion-proof manner. The anti-rotation element can be designed in the form of a pin, the cross section of which has a profile. Provision is particularly preferably made for the anti-rotation element to be designed as a separate part.

In the same way, the present disclosure also provides a high-voltage terminal for a stator that comprises a plastics element and at least three busbars arranged in the plastic housing so as to be isolated from one another for connecting the high-voltage terminal to power electronics, wherein each of the three busbars has a current input element and at least has two parallel current output elements, and wherein the plastics element has on its contact surface, optionally oriented towards the axial end face of a stator body, a fixing element that extends out of the plane of the contact surface, via which the high-voltage terminal can be fixed to the stator body of an electric machine, preferably to the axial face of the stator body.

In terms of the solution according to the disclosure, the high-voltage terminal is thus expanded to include a centering device. This centering means, designed in the form of the fixing element, gives the high-voltage terminal a clear position in the circumferential direction, as well as in the tangential and axial direction. The fixation in the axial direction also compensates for the tolerances in the axial direction and allows the forces generated due to tolerance deviations to be compensated.

Advantageously, the at least two parallel current output elements of each busbar are arranged at an end axially opposite the current input element, and are designed in the form of current output pins extending perpendicularly to a base body of the respective busbar and parallel to one another.

In this context, it is further preferred that the base body of each busbar has a first section comprising the current input element and a second section comprising the current output elements, and wherein both sections are rotated perpendicularly to one another, preferably by 90°.

BRIEF DESCRIPTION OF THE DRAWINGS

Both the disclosure and the technical field are explained in more detail below with reference to the figures. It should be noted that the disclosure is not intended to be limited by the exemplary embodiments shown. In particular, unless explicitly stated otherwise, it is also possible to extract partial aspects of the subject matter outlined in the figures and to combine them with other components and knowledge from the present description and/or figures. In particular, it should be noted that the figures and in particular the size relationships shown are only schematic in nature. Identical reference symbols indicate the same objects, so that where applicable, explanations from other figures can also be used. In the figures.

DETAILED DESCRIPTION

Figure 1:
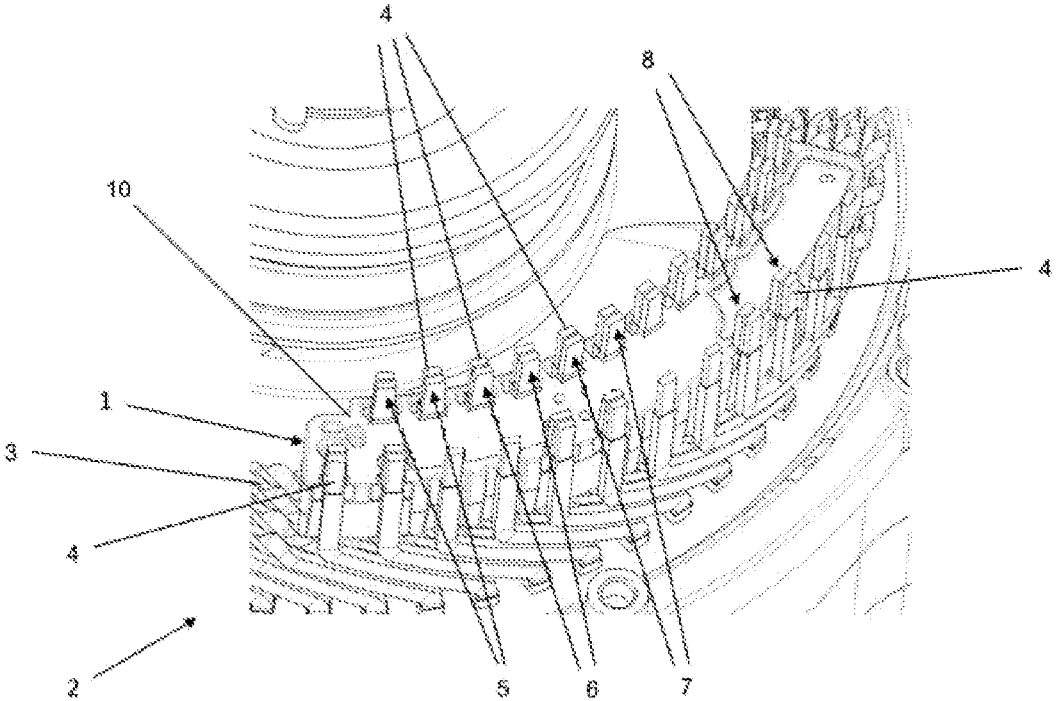
FIG. 1 shows a perspective view of an embodiment variant of the high-voltage terminal according to the disclosure, which is arranged on a stator winding.

FIG. 1 shows a perspective view of an embodiment variant of the high-voltage terminal 1 according to the disclosure, which is arranged on a stator winding 2 of an electric machine. In the present case, the stator winding 2 comprises a winding 3 which is formed from a continuous mat which is usually wound and folded several times. As can be seen from the illustration, the winding 3 has a plurality of individual conductors 4 which extend axially and make contact with the high-voltage terminal 1.

For this purpose, the high-voltage terminal 1 has three conductor phases 5, 6, 7 for the electrical connection of the high-voltage terminal 1 to the power electronics and a star phase designed as a rail 8. The respective conductor phases 5, 6, 7 and the star phase 8 are made from an electrically conductive material, such as copper or a copper-containing alloy.

Figure 2:
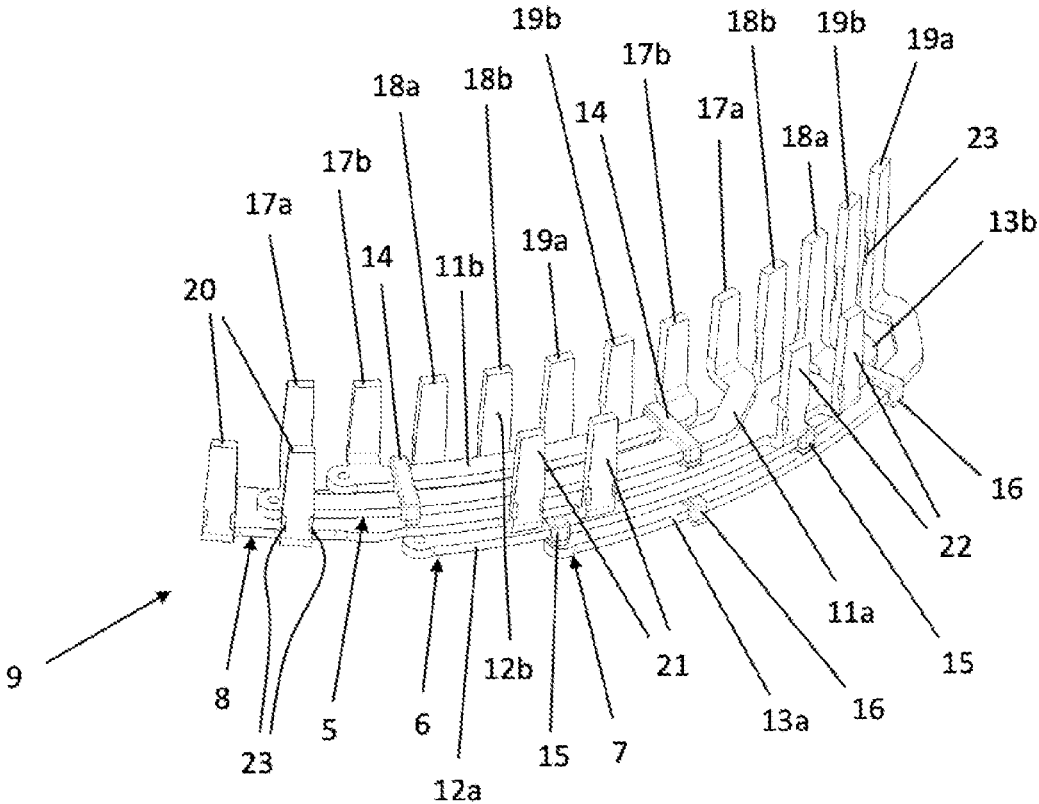
FIG. 2 shows an embodiment variant of a rail stack of the high-voltage terminal according to the disclosure from FIG. 1 in a perspective representation.

The internal structure of the high-voltage terminal 1 shown in FIG. 1 is explained with reference to the other figures. Thus, FIG. 2 shows an embodiment variant of a rail stack 9 in a perspective representation, as is accommodated in a plastics element 10 in the high-voltage terminal 1 shown in FIG. 2. In the embodiment variant shown here, the rail stack 9 is embedded in the plastics element 10, the plastics element 10 is therefore designed as an injection molded part.

Each of the three conductor phases 5, 6, 7 of the rail stack 9 is formed from two parallel rail tracks 11*a*, 11*b*, 12*a*, 12*b*, 13*a*, 13*b*, which are electrically isolated from one another and are connected so as to be spaced radially from one another via two spacer elements 14, 15, 16, which are formed from pre-molded parts.

In the rail stack 9 shown here, the conductor phase U5 forms the top layer and the conductor phase W7 forms the bottom layer. The conductor phase V6 and the star phase 8 are arranged in between, wherein the star phase 8 is arranged between the conductor phase U5 and the conductor phase V6, and respectively the conductor phase V6 between the star phase 8 and the conductor phase W7.

As can also be seen from FIG. 2, the respective rails or rail tracks 8, 11*a*, 11*b*, 12*a*, 12*b*, 13*a*, 13*b* of the high-voltage terminal 1 are designed in an arc shape, wherein the curvature essentially corresponds to the curvature of the ring-shaped configuration of the winding 3 (FIG. 1).

Each of the rail tracks 11*a*, 11*b*, 12*a*, 12*b*, 13*a*, 13*b* therefore comprises a curved base body and a contact pin 17*a*, 17*b*, 18*a*, 18*b*, 19*a*, 19*b* formed at each of its two distal ends on the inner circumference and perpendicular to the base body, and each extending in the same direction for making contact with the winding 3 of the stator of the electric machine. One of the two rail tracks 11*a*, 12*a*, 13*a* has a shorter extent in the circumferential direction than the respective second rail track 11*b*, 12*b*, 13*b*, wherein the respective longer rail track 11*a*, 12*a*, 13*a* then surrounds the shorter rail track 11*b*, 12*b*, 13*b* in the radial direction such that all contact pins 17*a*, 17*b*, 18*a*, 18*b*, 19*a*, 19*b* of both rail tracks 11*a*, 11*b*, 12*a*, 12*b*, 13*a*, 13*b* are arranged on an imaginary inner peripheral line.

The star phase 8 also has a curved base body with contact pins 20, 21, 22. The contact pins 20, 21, 22 of the star phase 8 are arranged to be distributed in the circumferential direction, wherein two first contact pins 20 are formed to be perpendicular to the base body and extend in parallel to one another on a first distal end on the outer circumference, and two third contact pins 22 are formed to be perpendicular to the base body on a second distal end of the base body on the outer circumference and extend in parallel to one another, and two further second contact pins 21 arranged on the outer circumference are positioned between the first and the third contact pins 20, 22.

Furthermore, the contact pins 17*a*, 17*b*, 18*a*, 18*b*, 19*a*, 19*b* of the respective rail tracks 11*a*, 11*b*, 12*a*, 12*b*, 13*a*, 13*b* and the contact pins 20, 21, 22 of the star phase 8 have an embossing 23 in the lower region, which is formed in the form of a recess. As can be seen from FIG. 2, each of the contact pins 17*a*, 17*b*, 18*a*, 18*b*, 19*a*, 19*b*, 20, 21, 22 has two of these recesses 23, which are each arranged in the corner regions and can be overmolded with plastic, as is shown in FIG. 5.

Figure 3:
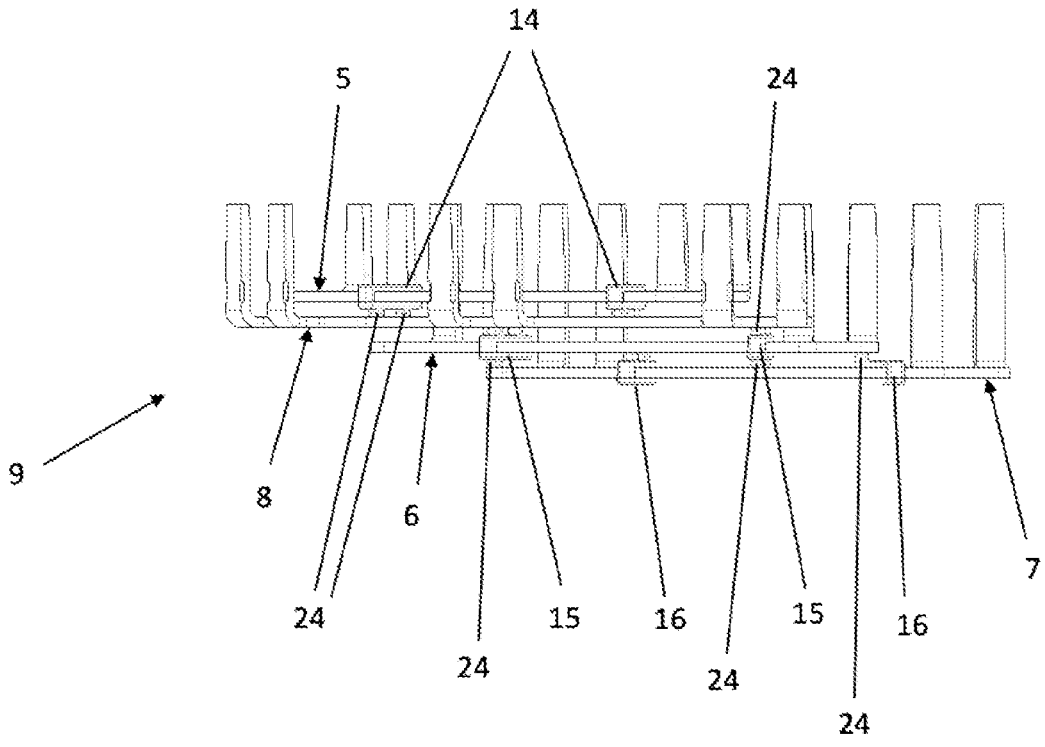
FIG. 3 shows the rail stack shown in FIG. 2 in a side view.
Figure 4A:
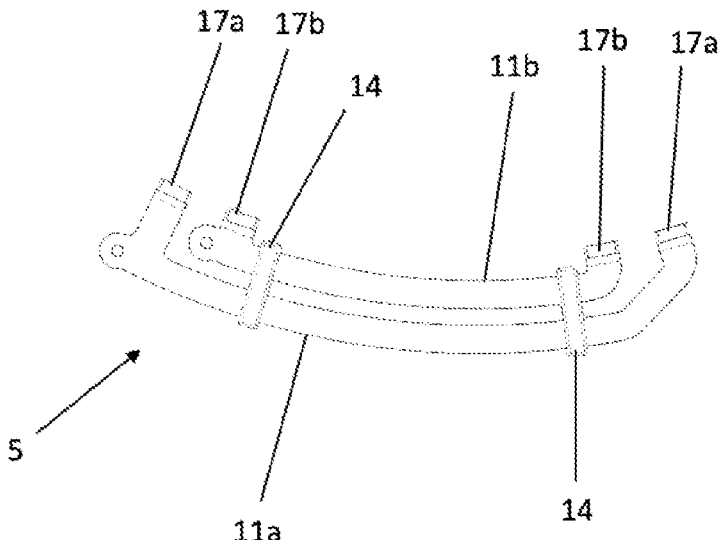
FIGS. 4A and 4B show an embodiment variant of one of the conductor phases of the rail stack shown in FIGS. 2 and 3.
Figure 4B:
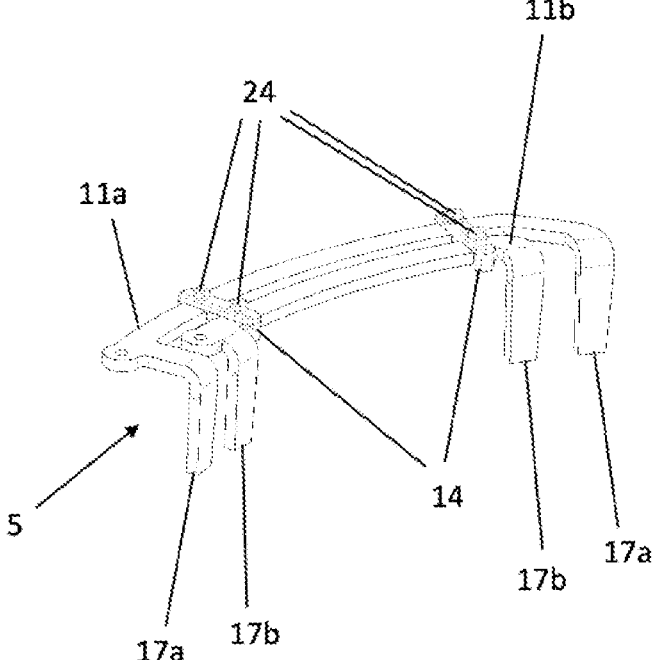

FIG. 3 shows the rail stack 9 in a side view. The illustration shows that the spacer elements 14, 15, 16 also have axially extending spacer pins 24, via which the respective spacer element 14, 15, 16 contacts the rail tracks 17*b*, 18*a*, 18*b*, 19*a*, 19*b* and the star phase 20, 21, 22.

Figure 5:
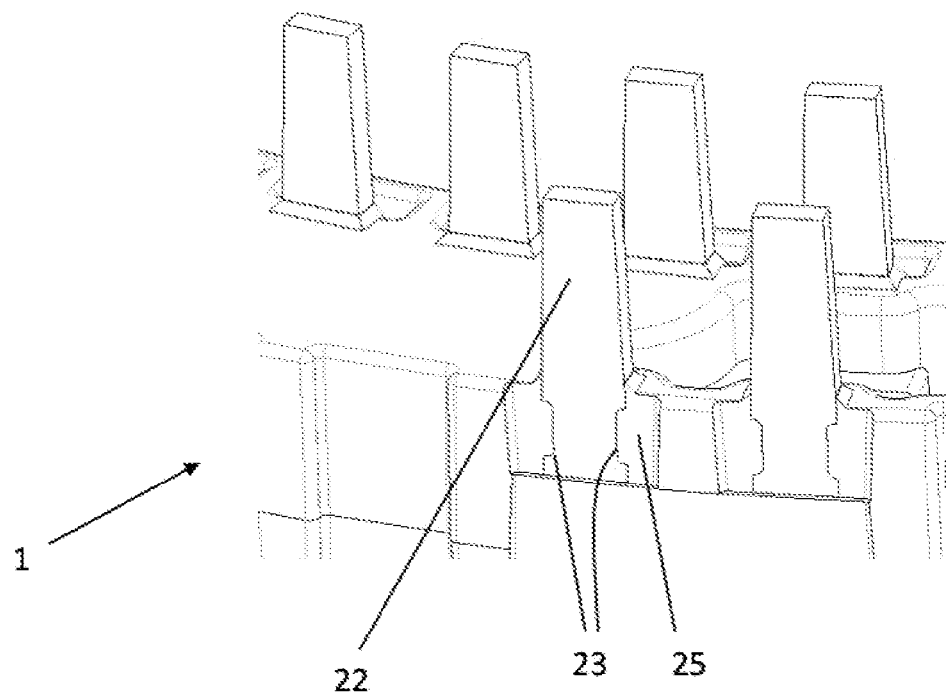
FIG. 5 shows a partial region of the high-voltage terminal according to FIG. 1 in a partial sectional view.

FIG. 5 shows a partial region of the high-voltage terminal 1 according to FIG. 1 in a partial section view from which the overmolding of the contact pins 17*a*, 17*b*, 18*a*, 18*b*, 19*a*, 19*b*, 20, 21, 22 can be seen. Shown here are the third contact pins 22 of the star phase 8, which are overmolded in a plastic 25.

Figure 6:
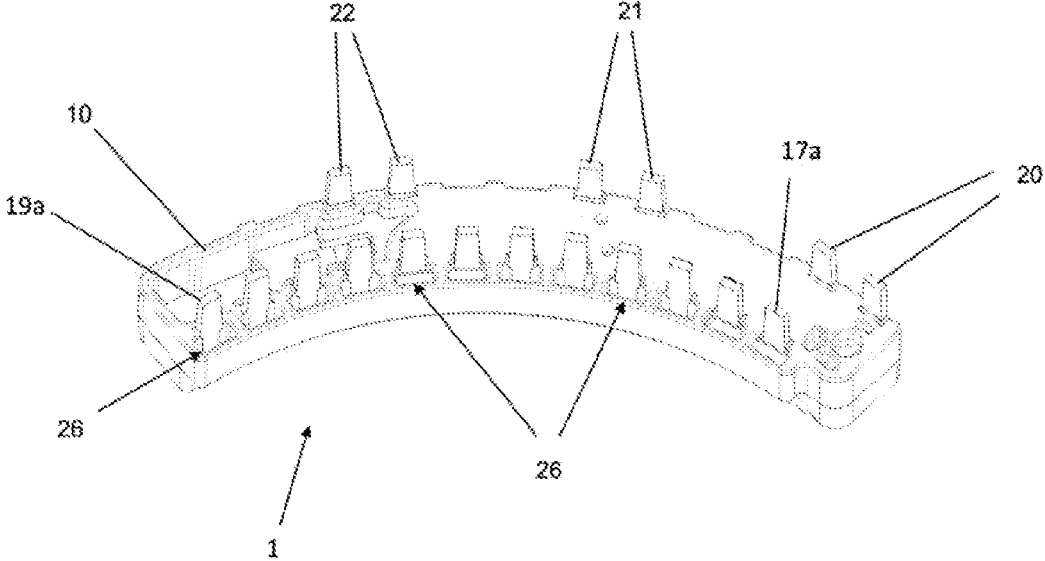
FIG. 6 shows the high-voltage terminal shown in FIG. 1 as a separate component in a plan view.
Figure 7:
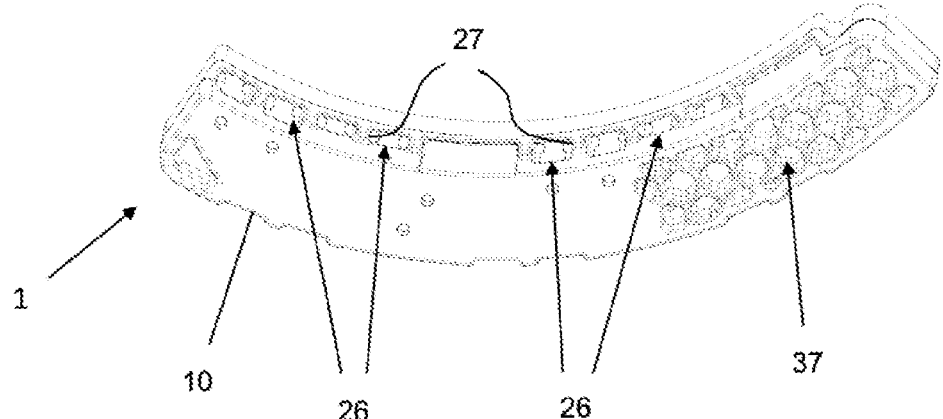
FIG. 7 shows the high-voltage terminal shown in FIG. 6 in a view from below.
Figure 8:
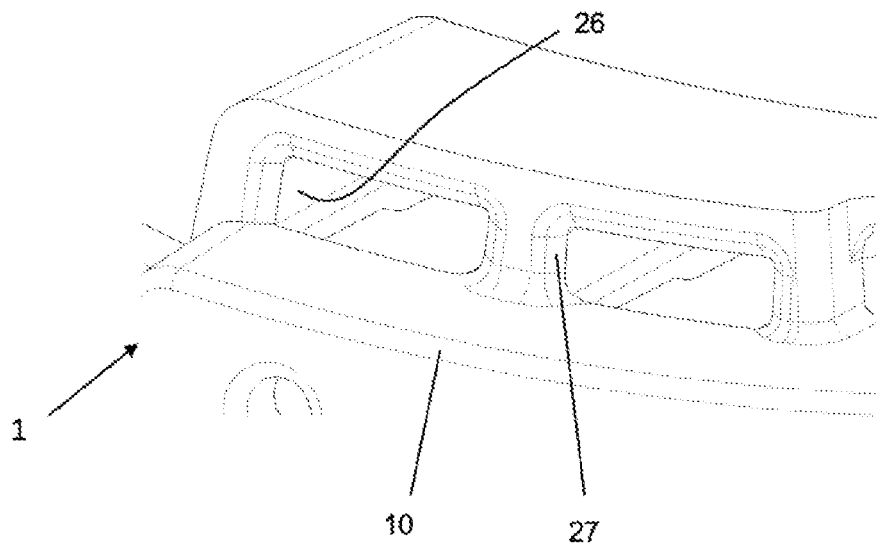
FIG. 8 shows an embodiment variant of a catch mechanism.

FIG. 6 shows a plan view of the high-voltage terminal 1 shown in FIG. 1 as a separate component. This representation shows that the high-voltage terminal 1 or the plastics element 10 has a row of openings 26 which are arranged to be adjacent to the contact pins 17*a*, 17*b*, 18*a*, 18*b*, 19*a*, 19*b*. The openings 26 form a type of catch mechanism through which the conductors 4 of the winding 3 can be inserted and thus pre-fixed before they are connected to the corresponding contact pins 17*a*, 17*b*, 18*a*, 18*b*, 19*a*, 19*b*, for example via a welded or soldered connection. Although not explicitly shown in FIG. 6, it is pointed out that the high-voltage terminal 1 can also have these openings 26 on the radially opposite circumferential line to pre-fix the conductors 4 intended for contacting the star phase 8 or the contact pins 20, 21, 22. To make it easier to insert or catch the various conductors 4, the openings 26 also have an inlet bevel 27 on the back which extends almost over their entire circumference (FIGS. 7 and 8).

Figure 9:
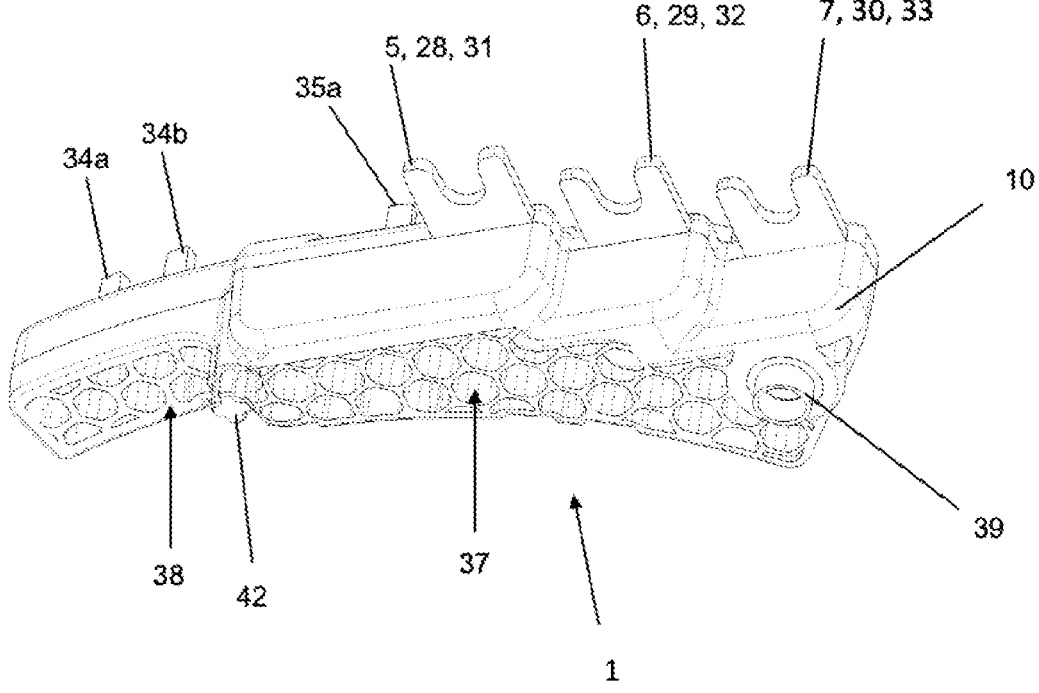
FIG. 9 shows a second variant of a high-voltage terminal.

FIG. 9 shows a second embodiment variant of a high-voltage terminal 1, which also comprises the three conductor phases 5, 6, 7 designed in the form of busbars 28, 29, 30, which are embedded in the plastics element 10. Each of the three busbars 28, 29, 30 has a current input element 31, 32, 33 and two parallel current output elements 34*a*, 34*b*, 35*a*, 35*b*, 36*a*, 36*b*. The current input elements 31, 32, 33 of each busbar 28, 29, 30 are U-shaped and can be electrically connected to a power electronics (not shown) via a screw contact.

Figure 11:
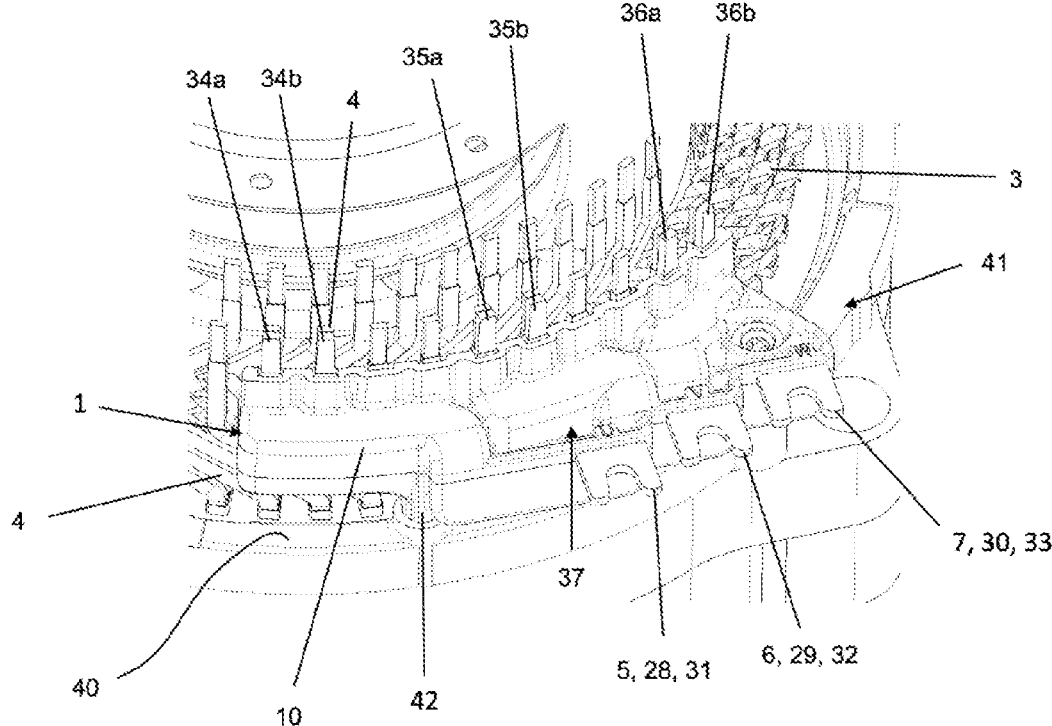
FIG. 11 shows an embodiment variant of a stator winding comprising the high-voltage terminal shown in FIG. 9.

The plastics element 10 has a honeycomb structure 37 like that of the first embodiment variant of the high-voltage terminal 1. On its lower contact surface 38, the high-voltage terminal 1 shown in FIG. 9 has a fixing element 39 which extends out of the plane of the latter and via which the high-voltage terminal 1 can be fixed on an axial end face 40 of a stator body 41 (FIG. 11). In addition to the fixing element 39, which is designed in the form of a ring element, the high-voltage terminal 1 has an anti-rotation element 42, via which the high-voltage terminal 1 can also be connected to the stator body 41 in a torsion-proof manner. As can be seen from the illustration in FIG. 9, the anti-rotation element 42 is designed in the form of a profiled pin.

Figure 10:
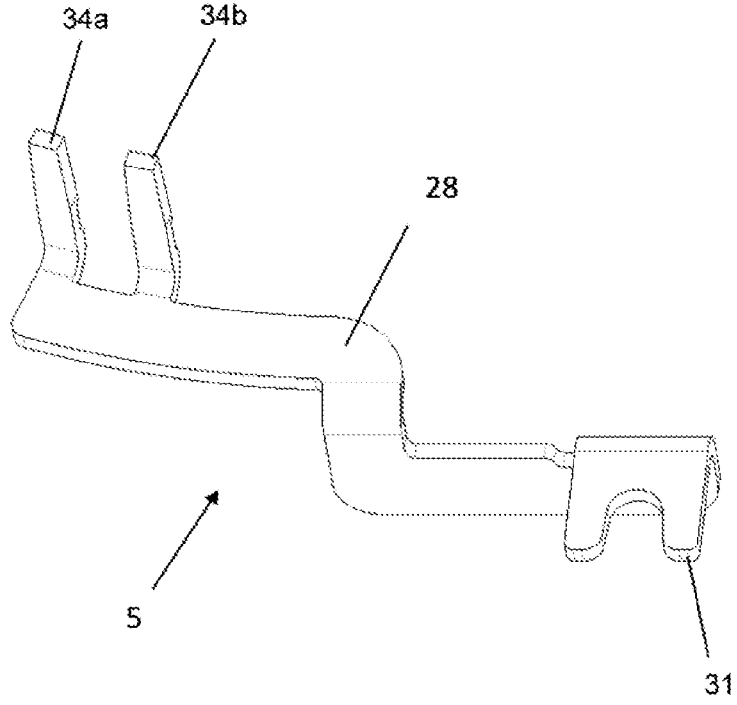
FIG. 10 shows an embodiment variant of a conductor phase of the high-voltage terminal shown in FIG. 9.

FIG. 10 shows an embodiment of conductor phase U or busbar 28 of high-voltage terminal 1 shown in FIG. 9. The busbar 28 is formed from a base body, which has a first section comprising the current input element 31 and a second section comprising the two parallel current output elements 34*a*, 34*b*. As can be seen from the illustration, the two sections are rotated to be perpendicular to one another, preferably by 90°.

LIST OF REFERENCE SYMBOLS

1 High-voltage terminal
2 Stator winding
3 Winding
4 Conductor of the winding
5 Conductor phase U
6 Conductor phase V
7 Conductor phase W
8 Rail/star phase
9 Rail stacks
10 Plastics element
11*a* First rail section conductor phase U
11*b* Second rail section conductor phase U
12*a* First rail section conductor phase V
12*b* Second rail section conductor phase V
13*a* First rail section conductor phase W
13*b* Second rail section conductor phase W
14 Spacer element
15 Spacer element
16 Spacer element
17*a* Contact pin
17*b* Contact pin
18*a* Contact pin
18*b* Contact pin
19*a* Contact pin
19*b* Contact pin
20 First contact pins star phase
21 Second contact pins star phase
22 Third contact pins star phase
23 Recesses
24 Spacer pins
25 Plastic
26 Opening
27 Inlet bevel
28 Busbar U
29 Busbar V
30 Busbar W
31 Current input element U
32 Current input element V
33 Current input element W
34*a* First current output element U
34*b* Second current output element U
35*a* First current output element V
35*b* Second current output element V
36*a* First current output element W
36*b* Second current output element W
37 Honeycomb structure
38 Contact surface
39 Fixing element
40 End surface
41 Stator body
42 Anti-rotation element

The invention claimed is:

1. A high-voltage terminal for a stator, comprising:
at least three conductor phases for electrically connecting the high-voltage terminal to power electronics;
at least one star phase formed as a rail;
each of the at least three conductor phases is formed from at least two parallel rail sections which are electrically isolated from one another via at least one spacer element and are connected at a radial distance from one another; and
the at least three conductor phases and the at least one star phase are stacked on top of one another within the high-voltage terminal to form a rail stack, and are at least one of inserted or imbedded in a plastics element via which the spacer elements are arranged electrically isolating from one another.

2. The high-voltage terminal according to claim 1, wherein the spacer elements are formed from at least one of pre-molded parts or plastic inlays.

3. The high-voltage terminal according to claim 1, wherein the spacer elements further include spacer pins which extend axially.

4. The high-voltage terminal according to claim 1, wherein the star phase and the rail sections are arcuate and have an inner and an outer circumference.

5. The high-voltage terminal according to claim 1, wherein each of the rail sections has a base body and a contact pin at two distal ends thereof on an inner circumference perpendicular to the base body and each extends in a same direction for making contact with a winding of the stator of an electric machine.

6. The high-voltage terminal according to claim 5, wherein in each case one of the two rail sections (of each said conductor phase has a shorter extent in a circumferential direction than the respective other of the two rail sections.

7. The high-voltage terminal according to claim 5, wherein the star phase has a base body and, on a first distal end on an outer circumference, two first contact pins formed to be perpendicular to the base body and extending in parallel to one another, on a second distal end of the base body, two third contact pins formed to be perpendicular to the base body and extending in parallel to one another on the outer circumference, and two further second contact pins arranged on the outer circumference between the first and third contact pins.

8. The high-voltage terminal according to claim 7, wherein the base body of the star phase has a longer extension in a circumferential direction compared to the conductor phases.

9. The high-voltage terminal according to claim 7, wherein the contact pins of the respective rail sections and the contact pins of the star phase extend in the same axial direction.

10. The high-voltage terminal according to claim 7, wherein the contact pins of the respective rail sections and the contact pins of the star phase in a lower region have at least one embossing overmolded with plastic.

11. The high-voltage terminal (1) according to claim 1, wherein the plastics element comprises a plurality of openings via which the conductors of a stator winding are adapted to be prefixed.

12. The high-voltage terminal according to claim 11, wherein each of the openings has an inlet bevel on a back side thereof.

13. The high-voltage terminal according to claim 1, further comprising a contact surface oriented towards an axial end face of a stator body, a fixing element extending out of a plane of the contact surface, via which the high-voltage terminal is fixable to the stator body.

14. The high-voltage terminal according to claim 13, wherein the fixing element comprises a ring element and extends in an axial direction.

15. The high-voltage terminal according to claim 13, further comprising an anti-rotation element arranged on the contact surface.

16. The high-voltage terminal according to claim 15, wherein the anti-rotation element comprises a pin having a cross-sectional profile.

17. The high-voltage terminal according to claim 15, wherein the anti-rotation element is formed as a separate part.

18. A high-voltage terminal for a stator, comprising:
a plastics element;
at least three busbars arranged in the plastics element so as to be isolated from one another, for connecting the high-voltage terminal to power electronics;
each of the three busbars has a current input element and at least two parallel current output elements, the at least two parallel current output elements being arranged perpendicular to the current input element of each of the three busbars; and
the plastics element on a contact surface thereof has a fixing element extending out of a plane of the contact surface via which the high-voltage terminal is fixable on the stator body of an electric machine.

19. The high-voltage terminal according to claim 18, wherein the busbars are at least one of inserted or embedded in the plastics element electrically isolated with respect to one another.

20. The high-voltage terminal according to claim 18, wherein the current input element of each of the current rails is arranged at a distal end thereof and is U-shaped.

21. The high-voltage terminal according to claim 18, wherein the at least two parallel current output elements of each busbar are arranged at an end axially opposite to the power input element and comprise current output pins that are perpendicular to a base body of the respective busbar and extend parallel to one another.

22. The high-voltage terminal according to claim 21, wherein the base body of each of the busbars has a first section comprising the current input element and a second section comprising the current output elements, and both sections are rotated in a perpendicular to one another.

23. The high-voltage terminal according to claim 18, wherein the plastics element has, at least partially, a honeycomb structure.

* * * * *